(12) United States Patent
Saitou

(10) Patent No.: US 7,900,983 B2
(45) Date of Patent: Mar. 8, 2011

(54) UNDERRUN PROTECTOR MOUNTING STRUCTURE OF VEHICLE

(75) Inventor: Takashi Saitou, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 307 days.

(21) Appl. No.: 12/160,251

(22) PCT Filed: Oct. 25, 2006

(86) PCT No.: PCT/JP2006/321257

§ 371 (c)(1),
(2), (4) Date: Jul. 8, 2008

(87) PCT Pub. No.: WO2007/080687

PCT Pub. Date: Jul. 19, 2007

(65) Prior Publication Data

US 2009/0001768 A1 Jan. 1, 2009

(30) Foreign Application Priority Data

Jan. 12, 2006 (JP) .............................. 2006-005079

(51) Int. Cl.
*B60R 19/04* (2006.01)
(52) U.S. Cl. .......................... 293/155; 293/102; 293/132
(58) Field of Classification Search ................. 293/102, 293/118, 132, 133, 135, 155
See application file for complete search history.

(56) References Cited

U.S. PATENT DOCUMENTS

| | | | | |
|---|---|---|---|---|
| 5,507,546 A | * | 4/1996 | Holley | 293/133 |
| 6,116,667 A | * | 9/2000 | Torcomian | 293/132 |
| 6,652,010 B1 | * | 11/2003 | Huddle et al. | 293/102 |
| 2004/0119303 A1 | * | 6/2004 | Gollungberg et al. | 293/132 |
| 2006/0119116 A1 | * | 6/2006 | Goertz | 293/132 |

FOREIGN PATENT DOCUMENTS

| | | |
|---|---|---|
| DE | 19644220 C1 | 12/1997 |
| GB | 2 086 811 A | 5/1982 |
| IO | 2151993 A | 7/1985 |
| IO | 2273472 A | 6/1994 |
| JP | 09-263196 A | 10/1997 |

\* cited by examiner

*Primary Examiner* — Joseph D Pape
(74) *Attorney, Agent, or Firm* — Sughrue Mion, PLLC

(57) ABSTRACT

An underrun protector mounting structure 3 includes: a chassis frame 4; a front underrun protector 5 which is disposed at the front or rear of the chassis frame 4 and extended in a lateral direction of the vehicle; a bracket 6 for fixing the front underrun protector 5 to the chassis frame 4; and a support part 7 interposed between the front underrun protector 5 and the bracket 6. The support part 7 has ribs 46 projected toward the bracket 6 and extended along the lateral direction of the vehicle. The bracket 6 has a plurality of rib receiving parts 30 which are formed approximately parallel to each other in a vertical direction of the vehicle with a space therebetween and which fit to the ribs 46. A mounting height of the support part 7 relative to the bracket 6 is set by selecting and fitting one of the plurality of rib receiving parts 30.

11 Claims, 9 Drawing Sheets

UNDERRUN PROTECTOR MOUNTING STRUCTURE OF VEHICLE

CROSS REFERENCE TO RELATED APPLICATION

This application is a National Stage of International Application No. PCT/JP2006/321257 filed on Oct. 25, 2006, claiming priority based on Japanese Patent Application No. 2006-005079, filed Jan. 12, 2006, the contents of all of which are incorporated herein by reference in their entirety.

TECHNICAL FIELD

The present invention relates to an underrun protector mounting structure disposed at the front or rear of a vehicle body frame.

BACKGROUND ART

When a vehicle with a low ride height (hereinafter referred to as a small vehicle) such as a passenger car collides head-on with or rear-ends a vehicle with a high ride height (hereinafter referred to as a large-sized vehicle) such as a truck, the small vehicle may go under the bottom of the large-sized vehicle. In order to prevent such an inconvenience, it has been known that the large-sized vehicle has an underrun protector provided at its front or rear.

Patent Document 1: Japanese Patent Application Publication No. Hei

DISCLOSURE OF INVENTION

Problems to be Solved by the Invention

Meanwhile, in order to prevent the small vehicle from going under the large-sized vehicle in collision, the underrun protector is required to be firmly fixed to a vehicle body frame and to be set at a predetermined height from the ground. Here, the underrun protector generally has its ground clearance adjusted by a supporting member, such as a bracket, which is fixed to the vehicle body frame. Thus, if the ground clearance varies for each of the different vehicle body frames, it is required to prepare different supporting members for each vehicle. In such a case, the number of parts is increased.

Such an inconvenience can be avoided by adjusting a mounting height of the underrun protector relative to the supporting member by use of a fastening member such as a bolt. However, in the structure described above, when the small vehicle collides with the underrun protector, impact load associated with the collision acts on the fastening member that fixes the bracket to the underrun protector. Accordingly, in some cases, possible breakage or the like of the fastening member may release a connection state between the underrun protector and the bracket.

Therefore, it is an object of the present invention to provide an underrun protector mounting structure of a vehicle—the structure which enables free selection of a mounting height while maintaining a connection performance of an underrun protector to a bracket.

Means for Solving the Problems

In order to achieve the foregoing object, an underrun protector mounting structure of a vehicle according to the present invention includes: a vehicle body frame; an underrun protector which is disposed at any one of the front and rear of the vehicle body frame and extended in a lateral direction of the vehicle; a bracket for fixing the underrun protector to the vehicle body frame; and a support part interposed between the underrun protector and the bracket. The support part has a rib projected toward the bracket and extended along the lateral direction of the vehicle. The bracket has a plurality of rib receiving parts which are formed approximately parallel to each other in a vertical direction of the vehicle with a space between each two of the rib receiving parts, and each of which can be fitted to the rib. A mounting height of the support part relative to the bracket is set by selecting one of the plurality of rib receiving parts and fitting the selected rib receiving part to the support part.

In the above configuration, for the underrun protector to be joined to the bracket, the support part is attached to a predetermined position on the bracket by fitting the rib to a predetermined rib receiving part among the plurality of rib receiving parts, and then the underrun protector is attached to the support part. Specifically, by previously fitting the rib of the support part lighter than the underrun protector to the rib receiving parts of the bracket, the underrun protector can be positioned relative to the bracket. Therefore, compared with the case where the heavy underrun protector is directly attached to the bracket, positioning of the underrun protector can be easily performed. Moreover, since no tools or the like are required for the positioning, efficient mounting of the underrun protector can be surely performed.

Moreover, in the bracket, the plurality of rib receiving parts which can be fitted to the rib of the support part are formed approximately parallel to each other in the vertical direction of the vehicle with a space between each two of the rib receiving parts. Thus, by selecting the rib receiving part having a desired height from the plurality of rib receiving parts and by fitting the selected rib receiving part to the rib of the support part, a mounting height of the underrun protector can be freely selected. Therefore, it is possible to use the same underrun protector for any of a plurality of vehicles having different ground clearances, and to adjust the mounting height of the underrun protector. Thus, versatility can be improved and parts-sharing can be achieved.

Furthermore, since the rib is formed in the support part that is separate from the underrun protector, it is not required to form the rib in the underrun protector itself. Therefore, the existing underrun protector having no rib can be used. Thus, the cost required for formation of the underrun protector can be reduced.

Moreover, an approximately plate-like first plate part and an approximately plate-like second plate part to be superposed on the first plate part on the bracket side may be provided in the support part. In the first plate part, a protrusion may be provided, which is projected toward the second plate part and extended along the lateral direction of the vehicle. Moreover, the rib may be provided in the second plate part, and the second plate part may be superposed on the first plate part in a state where a convex outer surface of the protrusion is fitted to a concave inner surface of the rib.

In the above configuration, for the underrun protector to be joined to the bracket, the second plate part is attached to a predetermined position on the bracket by fitting the rib to a predetermined rib receiving part among the plurality of rib receiving parts, and then the first plate part and the underrun protector can be attached to the second plate part. Therefore, compared with the case where the heavy underrun protector is directly attached to the bracket, positioning of the underrun protector can be easily performed.

Furthermore, after the second plate part is attached to the predetermined position on the bracket by fitting the rib to the predetermined rib receiving part and the first plate part is attached to the underrun protector, the first plate part can be attached to a predetermined position on the second plate part by fitting the convex outer surface of the protrusion of the first plate part to the concave inner surface of the rib of the second plate part. In this case, both of the first and second plate parts are separate from the underrun protector and the bracket. Thus, the protrusion and the rib can be set to have shapes that allow the both parts to be easily fitted to each other. Accordingly, after the first plate part is attached to the heavy underrun protector, for the first plate part to be joined to the second plate part, positioning can be easily performed. Moreover, the first and second plate parts are assembled in a surface-contact state. Thus, the first and second plate parts can be firmly fixed to each other. Consequently, a joint state of the underrun protector and the bracket can be surely maintained.

Moreover, on the underrun protector on the bracket side, the first and second plate parts are disposed in a stacked state. Thus, a substantial thickness of a portion of the underrun protector, the portion being in contact with the support part, is increased by thicknesses of the first and second plate parts. Therefore, rigidity and strength of the underrun protector can be improved.

Furthermore, the protrusions and the ribs are provided on the approximately plate-like first and second plate parts, respectively, so as to be extended along the lateral direction of the vehicle. Thus, the protrusion and the rib are fitted to each other across a relatively wide area. Moreover, for the underrun protector having the first plate part attached thereto to be joined to the bracket having the second plate part attached thereto, the protrusion of the first plate part and the rib of the second plate part can be easily fitted to each other. Thus, extensively efficient mounting of the underrun protector can be performed.

Moreover, a width of the support part in the lateral direction of the vehicle may be set larger than that of the bracket in the lateral direction of the vehicle on the underrun protector side.

In the above configuration, in the state where the underrun protector is joined to the bracket, the support part disposed on the underrun protector on the bracket side is arranged so as to be projected from the both ends of the bracket in the lateral direction of the vehicle. Specifically, a portion of the underrun protector, the portion on which most of the impact load acts in collision, in other words, a portion supported by the bracket is reinforced by the support part. Thus, occurrence of excessive stress in this portion can be surely suppressed. Therefore, local bending of the underrun protector can be effectively suppressed. Moreover, the rigidity and strength of the underrun protector as a whole can be improved.

Moreover, the support part is separate from the underrun protector. Thus, without causing an increase in weight due to an increased thickness of the underrun protector, or the like, a thickness of the support part and an overall length thereof in the lateral direction of the vehicle can be freely set to dimensions that can withstand the impact load. Therefore, the rigidity and strength of the underrun protector can be surely improved while minimizing the increase in weight. Moreover, a plurality of ribs may be provided in the support part, and the plurality of ribs may be disposed approximately parallel to each other in the vertical direction of the vehicle with a space between each two of the ribs.

In the above configuration, since the plurality of ribs are formed in the support part, the mounting height of the underrun protector can be freely selected by selecting a desired rib from the plurality of ribs. Specifically, compared with the case where only one rib is provided, a scope of selection of the mounting height of the underrun protector is expanded. Thus, a structure with further improved versatility can be achieved.

Moreover, by providing the plurality of ribs in the support part, rigidity and strength of the underrun protector can be further improved.

EFFECTS OF THE INVENTION

The underrun protector mounting structure of a vehicle according to the present invention enables free selection of the mounting height without impairing functions of the underrun protector.

Figure 1:
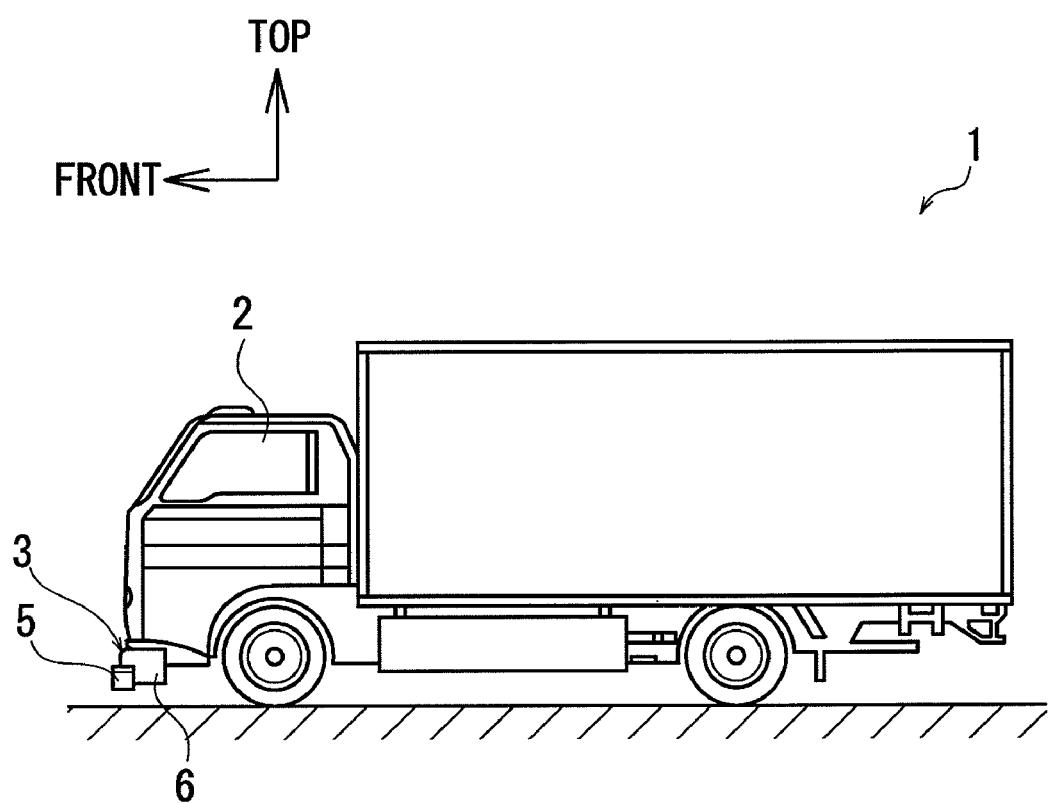
FIG. 1 is a schematic side view of a cab-over type truck including an underrun protector mounting structure according to the present invention.

EXPLANATION OF REFERENCE NUMERALS 1 vehicle
3 underrun protector mounting structure
4 chassis frame (vehicle body frame)
5 front underrun protector (underrun protector)
6 bracket
7 support part
30 rib receiving part
30a upper rib receiving part
30b lower rib receiving part
31 first plate part
32 second plate part
34 upper plate part
35 lower plate part
37 protrusion
37a upper protrusion
37b lower protrusion
44 extended part
46 rib
46a upper rib
46b lower rib

BEST MODE FOR CARRYING OUT THE INVENTION

Figure 2:
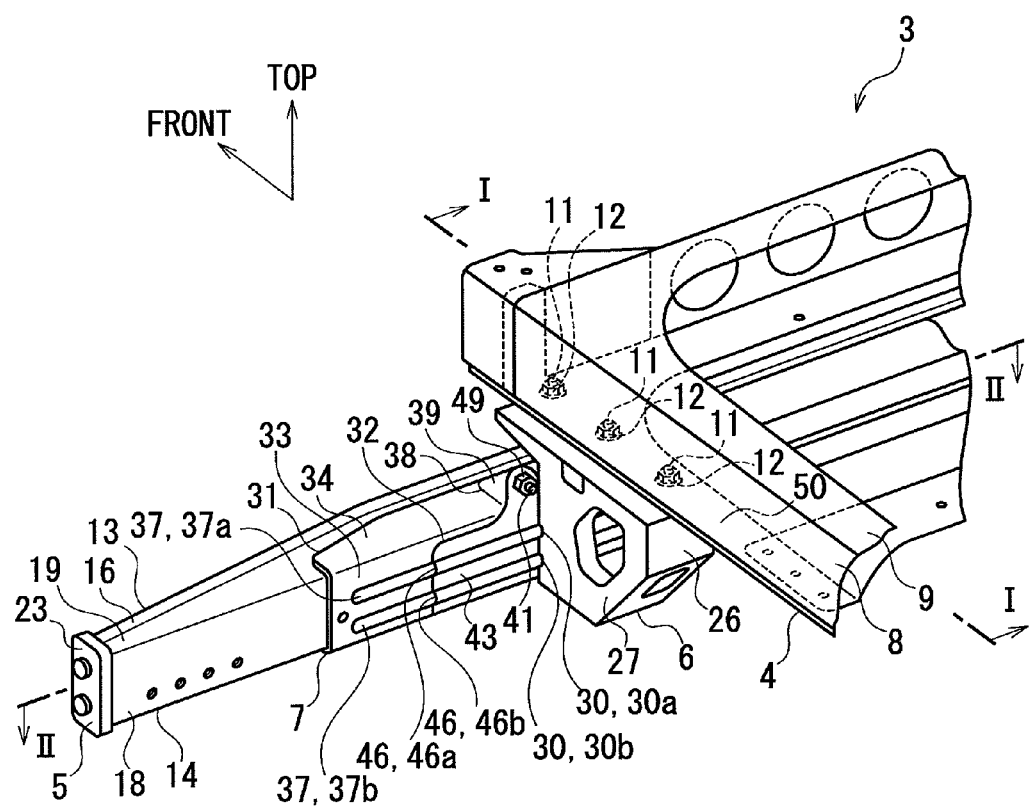
FIG. 2 is an enlarged perspective view of a main part of the underrun protector mounting structure.
Figure 3:
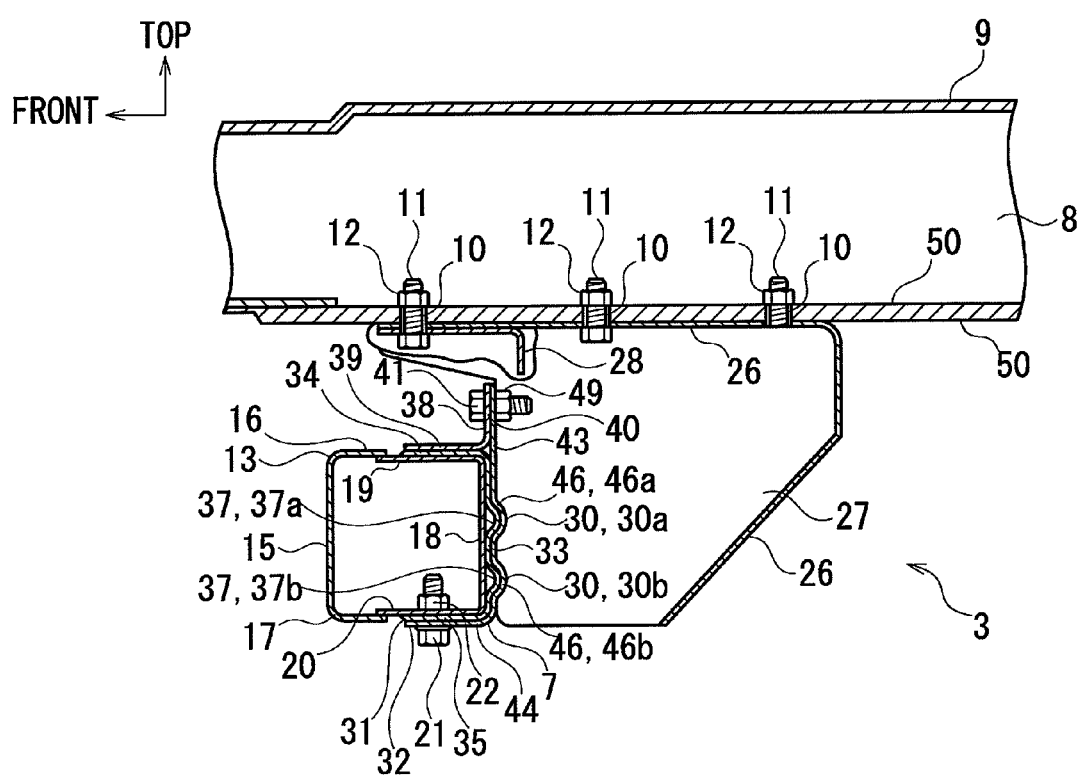
FIG. 3 is a cross-sectional view along the line I-I in FIG. 2.
Figure 4:
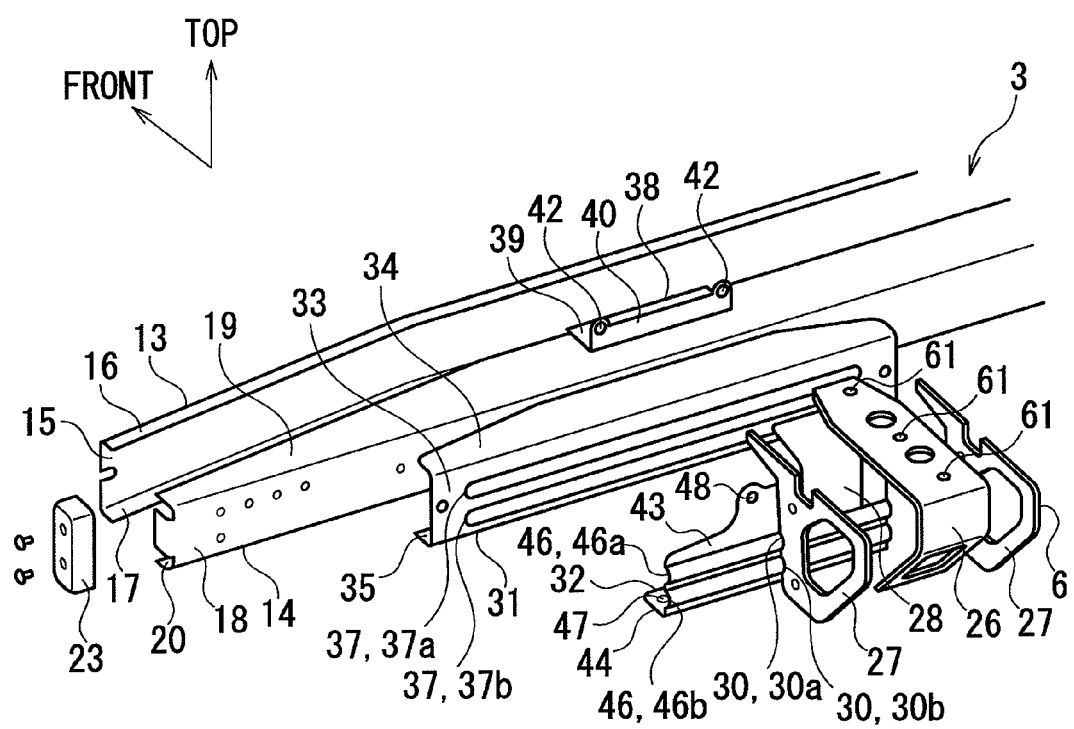
FIG. 4 is an exploded perspective view of the underrun protector mounting structure.
Figure 5:
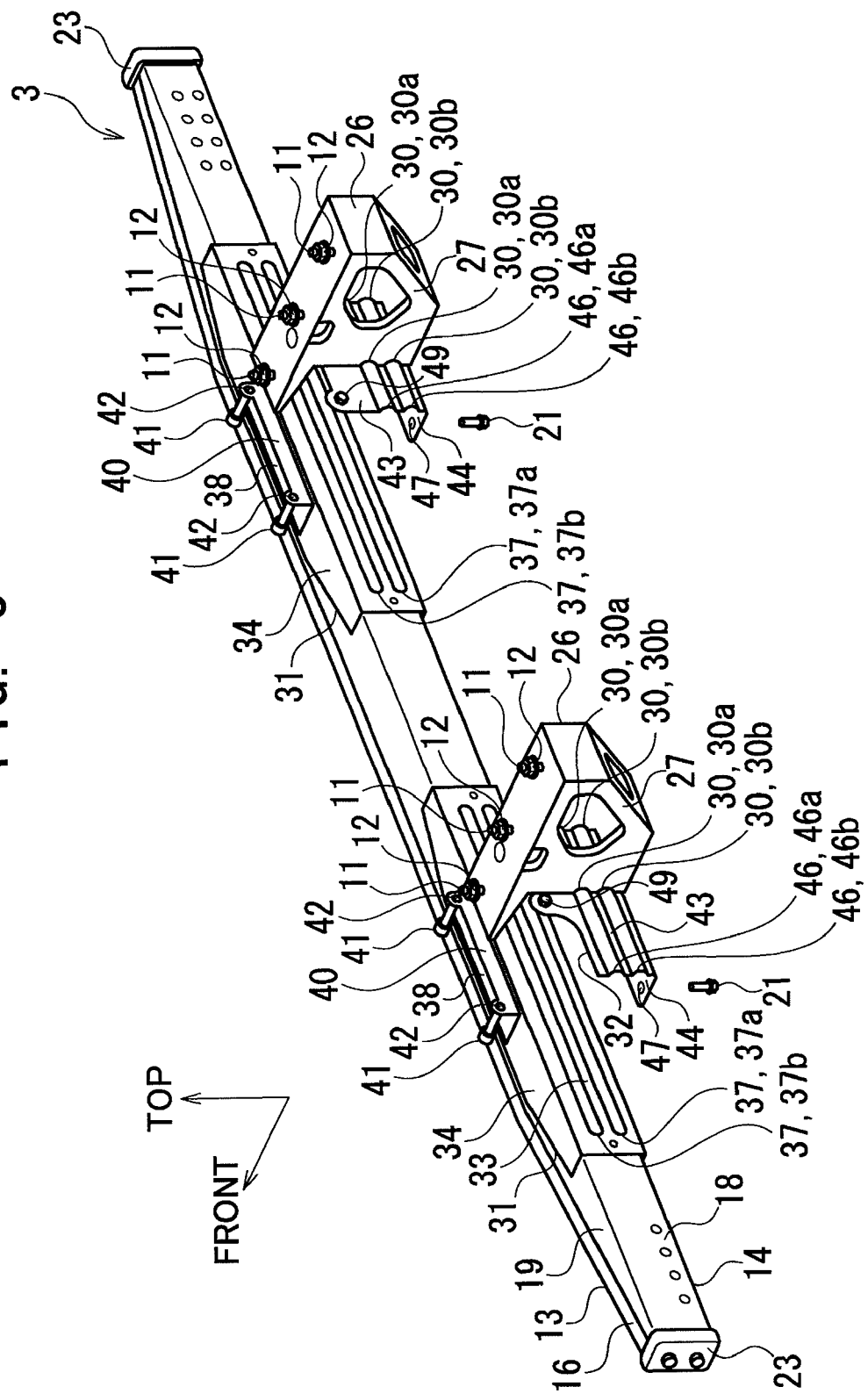
FIG. 5 is an exploded perspective view of the underrun protector mounting structure.
Figure 6:
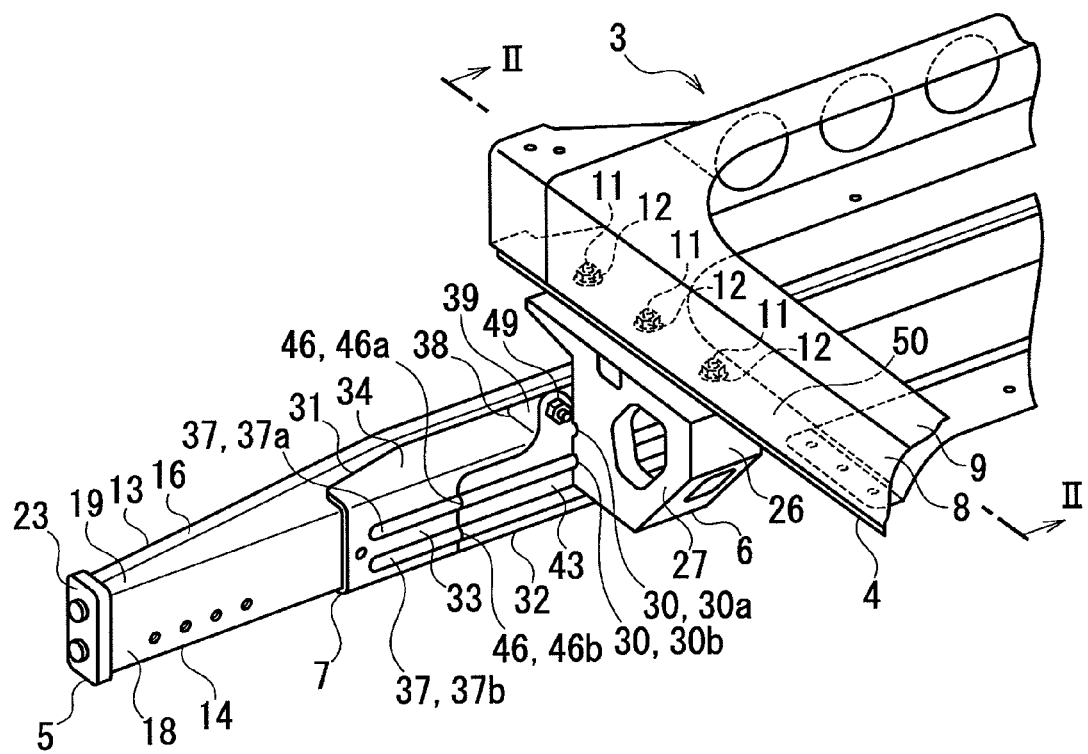
FIG. 6 is an enlarged perspective view of a main part, showing a mounting state of a front underrun protector in the cab-over type truck having a relatively high ride height.
Figure 7:
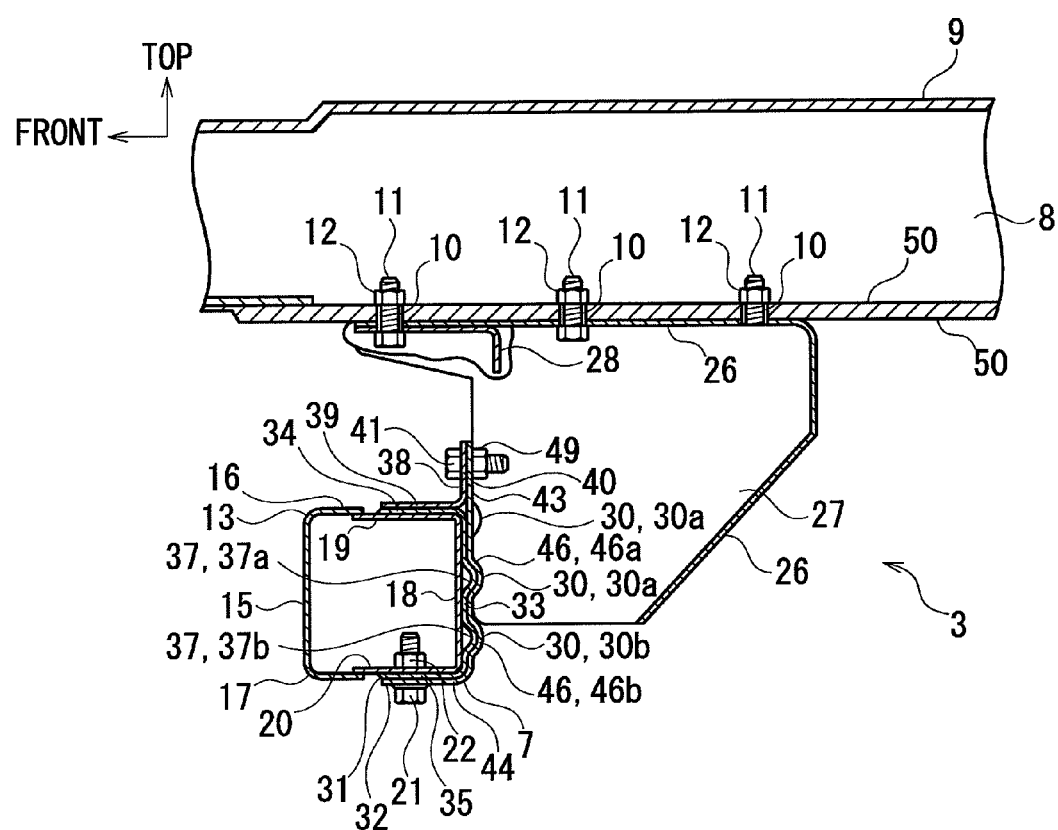
FIG. 7 is a cross-sectional view along the line II-II in FIG. 6.

With reference to the drawings, an embodiment of the present invention will be described below. FIG. 1 is a schematic side view of a cab-over type truck according to this embodiment. FIG. 2 is an enlarged perspective view of a main part of an underrun protector mounting structure. FIG. 3 is a cross-sectional view along the line I-I in FIG. 2. FIG. 4 is an exploded perspective view of the underrun protector mounting structure. FIG. 5 is an exploded perspective view of the underrun protector mounting structure. FIG. 6 is an enlarged perspective view of a main part, showing a mounting state of a front underrun protector in the cab-over type truck having a relatively high ride height. FIG. 7 is a cross-sectional view along the line II-II in FIG. 6. Note that "front" in the drawings represents the front of the vehicle and "top" in the drawings represents the top of the vehicle. Moreover, a left-right direction in the following description means a left-right direction facing the direction of movement of the vehicle.

As shown in FIG. 1, a vehicle 1 according to this embodiment is a cab-over type vehicle with a cab 2 generally positioned more anteriorly than an engine (not shown), and is equipped with an underrun protector mounting structure 3 at its front.

As shown in FIG. 2, the underrun protector mounting structure 3 includes: a chassis frame (vehicle body frame) 4 which is extended in a longitudinal direction on both sides in a lateral direction of the vehicle; a front underrun protector (underrun protector) 5 which is disposed at the front of the chassis frame 4 and extended in the lateral direction of the vehicle; a bracket 6 for fixing the front underrun protector 5 to the chassis frame 4; and a support part 7 interposed between the front underrun protector 5 and the bracket 6.

The chassis frame 4 has an approximately squared U-shaped cross-section and includes a side wall part 8, an upper wall part 9 and a bottom wall part 50. Specifically, the upper wall part 9 and the bottom wall part 50 are extended, while facing each other, inward in the lateral direction of the vehicle respectively from both ends, in a vertical direction, of the side wall part 8. At predetermined positions on the bottom wall part 50, a plurality of bolt insertion holes 10 for mounting the bracket are formed, into which bolts 11 can be inserted. Above the bolt insertion holes 10 for mounting the bracket, nuts 12 which can be fitted to the bolts 11 are provided.

As shown in FIGS. 2, 4 and 5, the front underrun protector 5 has a protector piece 13 on the front side of the vehicle and a protector piece 14 on the rear side of the vehicle. Both of the protector pieces 13 and 14 are made of thin steel plates and formed to have an approximately squared U-shaped cross-section. The protector piece 13 has a side wall part 15, an upper wall part 16 and a bottom wall part 17. Specifically, the upper wall part 16 and the bottom wall part 17 are extended, while facing each other, toward the rear of the vehicle from both ends of the side wall part 15. The protector piece 14 has a side wall part 18, an upper wall part 19 and a bottom wall part 20. Specifically, the upper wall part 19 and the bottom wall part 20 are extended, while facing each other, toward the front of the vehicle from both ends of the side wall part 18. A width of the side wall part 18 of the protector piece 14 in a vertical direction of the vehicle is set smaller than that of the side wall part 15 of the protector piece 13 in the vertical direction of the vehicle. Moreover, at predetermined positions on the bottom wall part 20 of the protector piece 14, bolt insertion holes (not shown) for mounting the support part are formed, into which bolts 21 can be inserted. Above the bolt insertion holes for mounting the support part, nuts 22 which can be fitted to the bolts 21 are fixed by welding or the like.

The protector pieces 13 and 14 are connected to each other by welding or the like. Thus, a closed cross-section is formed between the protector pieces 13 and 14. Moreover, caps 23 are attached to both ends of the front underrun protector 5.

As shown in FIGS. 2 to 5, the bracket 6 is formed into an approximate box shape and has a peripheral wall part 26 having an approximately V-shaped cross-section, approximately plate-like side wall parts 27 and 27 disposed at lateral sides of the peripheral wall part 26, and a front wall part 28 having an approximately L-shaped cross-section and disposed at a front side of the side wall parts 27 and 27. The peripheral wall part 26 and the side wall parts 27, as well as the side wall parts 27 and the front wall part 28, are connected by welding or the like in a state where peripheral edges thereof come into contact with each other respectively.

A plurality of concave rib receiving parts 30 are formed on the side wall parts 27 on the front underrun protector 5 side. Specifically, the rib receiving parts 30 can be fitted to a plurality of ribs 46, to be described later, of the support part 7. The plurality of rib receiving parts 30 have upper rib receiving parts 30a and lower rib receiving parts 30b. The upper and lower rib receiving parts 30a and 30b are formed into approximately the same shape and disposed facing each other in a state where the peripheral wall part 26 and the side wall parts 27 and 27 are connected to each other.

Moreover, on upper surfaces of the peripheral wall part 26 and the front wall part 28, a plurality of bolt insertion holes 61 for mounting the chassis frame are formed, into which the bolts 11 can be inserted.

The bracket 6 is fastened and fixed to the chassis frame 4 in the following manner. Specifically, in a state where the upper surface of the peripheral wall part 26 of the bracket 6 comes into contact with a lower surface of the bottom wall part 50 of the chassis frame 4, the bolts 11 are inserted from below into the bolt insertion holes 10 for mounting the bracket in the chassis frame 4 and the bolt insertion holes 61 for mounting the chassis frame in the bracket 6, respectively. Thereafter, the bolts 11 are fitted to the nuts 12 attached to the chassis frame 4 and fastened.

The support part 7 has a first plate part 31 with an approximately squared U-shaped cross-section, which is disposed on the front underrun protector 5 side and a second plate part 32 with an approximately L-shaped cross-section, which is disposed on the first plate part 31 on the bracket 6 side. The first plate part 31 is formed to be wider in the lateral direction of the vehicle than the second plate part 32. The first and second plate parts 31 and 32 are stacked in a leaf spring shape in the longitudinal direction of the vehicle. Moreover, a width of the second plate part 32 in the lateral direction of the vehicle is set larger than that of the bracket 6 in the lateral direction of the vehicle on the front underrun protector 5.

The first plate part 31 has a side wall part 33, an upper plate part 34 and a lower plate part 35. Specifically, the upper plate part 34 and the lower plate part 35 are extended, while facing each other, toward the front of the vehicle from both ends of the side wall part 33. A shape of an inner surface of the first plate part 31 is approximately the same as that of an outer surface of the protector piece 14 of the front underrun protector 5. In a state where the first plate part 31 and the front underrun protector 5 are attached to each other, the side wall part 33, the upper plate part 34 and the lower plate part 35 of the first plate part 31 come into contact with the side wall part 18, the upper wall part 19 and the bottom wall part 20 of the protector piece 14, respectively.

On the side wall part 33 of the first plate part 31, a plurality of protrusions 37, each having an approximately convex cross-section, are formed, which are projected toward the second plate part 32 and extended along the lateral direction of the vehicle. The plurality of protrusions 37 include an upper protrusion 37a and a lower protrusion 37b. The upper and lower protrusions 37a and 37b are formed to have approximately the same shape and provided approximately parallel to each other in the vertical direction of the vehicle with a space therebetween. Moreover, in a state where the first and second plate parts 31 and 32 are stacked, convex outer surfaces of the upper and lower protrusions 37a and 37b are fitted to concave inner surfaces of upper and lower ribs 46a and 46b, to be described later, of the second plate part 32, respectively.

At predetermined positions on the lower plate part 35 of the first plate part 31, bolt insertion holes (not shown) for mounting the front underrun protector are formed, into which the bolts 21 can be inserted. Moreover, a supporting piece 38 is connected, by welding or the like, to the upper plate part 34 of the first plate part 31. This supporting piece 38 is formed to have an approximately L-shaped cross-section and has a bottom wall part 39 and a side wall part 40. Specifically, the bottom wall part 39 comes into contact with the upper plate part 34 of the first plate part 31, and the side wall part 40 is extended so as to be bent upward from an end of the bottom wall part 39 on the bracket 6 side. At predetermined positions on the side wall part 40, bolt insertion holes 42 for mounting the second plate part are formed, into which bolts 41 can be inserted.

The second plate part 32 has a side wall part 43 and an extended part 44 which is extended so as to be bent toward the front underrun protector 5 from a lower end of the side wall part 43.

On the side wall part 43 of the second plate part 32, a plurality of ribs 46, each having an approximately concave cross-section, are formed, which are projected toward the bracket 6 and extended along the lateral direction of the vehicle. The plurality of ribs 46 include the upper rib 46a and the lower rib 46b. These upper and lower ribs 46a and 46b are formed to have approximately the same shape and provided approximately parallel to each other in the vertical direction of the vehicle with a space therebetween, at positions corresponding to the upper and lower rib receiving parts 30a and 30b of the bracket 6. Moreover, convex outer surfaces of the upper and lower ribs 46a and 46b are formed into a shape where these ribs 46a and 46b can be fitted to the plurality of rib receiving parts 30.

At predetermined positions on the extended part 44 of the second plate part 32, bolt insertion holes 47 for mounting the front underrun protector 5 are formed, into which the bolts 21 can be inserted. Moreover, in an upper part of the side wall part 43 of the second plate part 32, bolt insertion holes 48 for mounting the supporting piece 38 are formed, into which the bolts 41 can be inserted.

Next, with reference to FIGS. 2 and 3, description will be given of a method for joining the front underrun protector 5 to the bracket 6.

First, the second plate part 32 is allowed to come into contact with the bracket 6 by fitting the upper and lower ribs 46a and 46b of the second plate part 32 to the upper and lower rib receiving parts 30a and 30b of the bracket 6, respectively. Thereafter, the bracket 6 and the second plate part 32 are connected to each other by welding, for example, a contact spot between the bracket 6 and the second plate part 32. Subsequently, an assembly thus obtained is fixed at a predetermined position on the chassis frame 4.

Next, the inner surface of the first plate part 31 is fitted to the outer surface of the front underrun protector 5. Moreover, the first plate part 31 is fixed, by welding, for example, to the front underrun protector 5 at a position where the bolt insertion holes formed in the front underrun protector 5 (the holes for mounting the support part), and the bolt insertion holes formed in the first plate part 31 (the holes for mounting the front underrun protector 5), are aligned with each other. Thereafter, the supporting piece 38 is fixed to the upper plate part 34 of the first plate part 31 by welding or the like at a position corresponding to the second plate part 32 fixed to the bracket 6.

Thereafter, the front underrun protector 5 is placed on an upper surface of the extended part 44 of the second plate part 32 fixed to the bracket 6. In this state, the upper and lower protrusions 37a and 37b of the first plate part 31 fixed to the front underrun protector 5 are fitted to the upper and lower ribs 46a and 46b of the second plate part 32 fixed to the bracket 6, respectively. Subsequently, the bolts 41 are inserted from the front underrun protector 5 side into the bolt insertion holes 42 in the supporting piece 38 (the holes for mounting the second plate part) and into the bolt insertion holes 48 in the second plate part 32 (the holes for mounting the supporting piece), respectively. Thereafter, nuts 49 are fitted and fastened to the bolts from the bracket 6 side (see FIG. 4). Moreover, the bolts 21 are inserted from below into the bolt insertion holes 47 in the second plate part 32 (the holes for mounting the front underrun protector), into the bolt insertion holes in the first plate part 31 (the holes for mounting the front underrun protector), and into the bolt insertion holes in the front underrun protector 5 (the holes for mounting the support part), respectively. Thereafter, the bolts 21 are fitted and fastened to the nuts 22 attached to the front underrun protector 5. Thus, the front underrun protector 5 is fixed to the chassis frame 4.

Moreover, as shown in FIGS. 6 and 7, in the case where the underrun protector mounting structure 3 of the present invention is adopted in a vehicle (not shown) having a relatively high ride height due to a tire size or the like, first, the second plate part 32 and the bracket 6 are allowed to come into contact with each other by fitting the lower rib receiving part 30b of the bracket 6 and the upper rib 46a of the second plate part 32 to each other. Thereafter, the bracket 6 and the second plate part 32 are connected to each other by welding, for example, a contact spot between the bracket 6 and the second plate part 32. Next, the first plate part 31 fixed to the front underrun protector 5 and the second plate part 32 fixed to the bracket 6 are joined to each other. Thus, a mounting position of the front underrun protector 5 can be lowered to a predetermined height from the ground.

As described above, according to this embodiment, for the front underrun protector 5 to be joined to the bracket 6, the support part 7 is attached to a predetermined position on the bracket 6 by fitting the ribs 46 to the rib receiving parts 30, and then the front underrun protector 5 is attached to the support part 7. Specifically, by previously fitting the ribs 46 of the support part 7 lighter than the front underrun protector 5 to the rib receiving parts 30 of the bracket 6, the front underrun protector 5 can be positioned relative to the bracket 6. Therefore, compared with the case where the heavy front underrun protector 5 is directly attached to the bracket 6, positioning of the front underrun protector 5 can be easily performed. Moreover, since no tools or the like are required for the positioning, efficient mounting of the front underrun protector 5 can be surely performed.

Moreover, in the bracket 6, the upper and lower rib receiving parts 30a and 30b which can be fitted to the upper and lower ribs 46a and 46b of the support part 7 are formed approximately parallel to each other in the vertical direction of the vehicle with a space therebetween. Thus, by selecting any of the upper and lower rib receiving parts 30a and 30b, which are different in the vertical direction of the vehicle, and by fitting the selected rib receiving part to the upper rib 46a of the support part 7, a mounting height of the front underrun protector 5 can be freely selected. Therefore, it is possible to use the same front underrun protector 5 for a plurality of vehicles having different ground clearances, and to adjust the mounting height of the front underrun protector. Thus, versatility can be improved and parts-sharing can be achieved.

Furthermore, since the ribs 46 are formed in the support part 7 that is separate from the front underrun protector 5, it is not required to form the ribs 46 in the front underrun protector 5 itself. Therefore, the existing front underrun protector 5 having no ribs 46 can be used. Thus, the cost required for formation of the front underrun protector 5 can be reduced.

For the front underrun protector 5 to be joined to the bracket 6, the second plate part 32 is attached to a predetermined position on the bracket 6 by fitting the ribs 46 to the rib receiving parts 30, and then the first plate part 31 and the front underrun protector 5 is attached to the second plate part 32. Moreover, in the above case, by providing the extended part 44 in the second plate part 32, the first plate part 31 and the front underrun protector 5 can be previously and temporarily retained on the upper surface of the extended part 44. Therefore, compared with the case where the heavy front underrun protector 5 is directly attached to the bracket 6, positioning of the front underrun protector 5 can be easily performed.

Furthermore, after the second plate part 32 is attached to the predetermined position on the bracket 6 by fitting the ribs 46 to the rib receiving parts 30 and the first plate part 31 is attached to the front underrun protector 5, the first plate part 31 can be attached to a predetermined position on the second plate part 32 by fitting the convex outer surfaces of the protrusions 37 of the first plate part 31 to the concave inner surfaces of the ribs 46 of the second plate part 32. In this case, both of the first and second plate parts 31 and 32 are separate from the front underrun protector 5 and the bracket 6. Thus, the protrusions 37 and the ribs 46 can be set to have shapes that allow the both parts to be easily fitted to each other. Accordingly, after the first plate part 31 is attached to the heavy front underrun protector 5, it is possible to easily perform positioning in joining the first plate part 31 to the second plate part 32. Moreover, the first and second plate parts 31 and 32 are joined to each other in a surface-contact state. Thus, the first and second plate parts 31 and 32 can be firmly fixed to each other. Consequently, a joint state of the front underrun protector 5 and the bracket 6 can be surely maintained.

Moreover, on the front underrun protector 5 on the bracket 6 side, the first and second plate parts 31 and 32 are disposed in a stacked state. Thus, a substantial thickness of a portion of the front underrun protector 5, the portion being in contact with the support part 7, is increased by thicknesses of the first and second plate parts 31 and 32. Therefore, rigidity and strength of the front underrun protector 5 can be improved.

Furthermore, the protrusions 37 and the ribs 46 are provided on the approximately plate-like first and second plate parts 31 and 32, respectively, so as to be extended along the lateral direction of the vehicle. Thus, the protrusions 37 and the ribs 46 are fitted to each other across a relatively wide area. Moreover, the first and second plate parts 31 and 32 are members lighter than the front underrun protector 5 and the bracket 6. Thus, the first and second plate parts 31 and 32 can be easily attached to the front underrun protector 5 and the bracket 6, respectively. For the front underrun protector 5 having the first plate part 31 attached thereto to be joined to the bracket 6 having the second plate part 32 attached thereto, as described above, the protrusions 37 of the first plate part 31 and the ribs 46 of the second plate part 32 can be easily fitted to each other. Thus, extensively efficient mounting of the front underrun protector 5 can be performed.

In the state where the front underrun protector 5 is joined to the bracket 6, the support part 7 disposed on the front underrun protector 5 on the bracket 6 side is arranged so as to be projected from the both ends of the bracket 6 in the lateral direction of the vehicle. Specifically, a portion of the front underrun protector 5, the portion on which most of the impact load acts in collision, in other words, a portion supported by the bracket 6 is reinforced by the support part 7. Thus, occurrence of excessive stress in this portion can be surely suppressed. Therefore, local bending of the front underrun protector 5 can be effectively suppressed. Moreover, the rigidity and strength of the front underrun protector 5 as a whole can be improved.

Moreover, the support part 7 is separate from the front underrun protector 5. Thus, without causing an increase in weight due to the increase in the thickness of the front underrun protector 5, or the like, a thickness of the support part 7 and an overall length thereof in the lateral direction of the vehicle can be freely set to dimensions that can withstand the impact load. Therefore, the rigidity and strength of the front underrun protector 5 can be surely improved while minimizing the increase in weight. Since the upper and lower ribs 46a and 46b are formed in the support part 7, the mounting height of the front underrun protector 5 can be freely selected by selecting any of the upper and lower ribs 46a and 46b. Specifically, compared with the case where only one rib 46 is provided, a scope of selection of the mounting height of the front underrun protector 5 is expanded. Thus, a structure with further improved versatility can be achieved.

Moreover, by providing the plurality of ribs 46 in the support part 7, the rigidity and strength of the front underrun protector 5 can be further improved.

Figure 8:
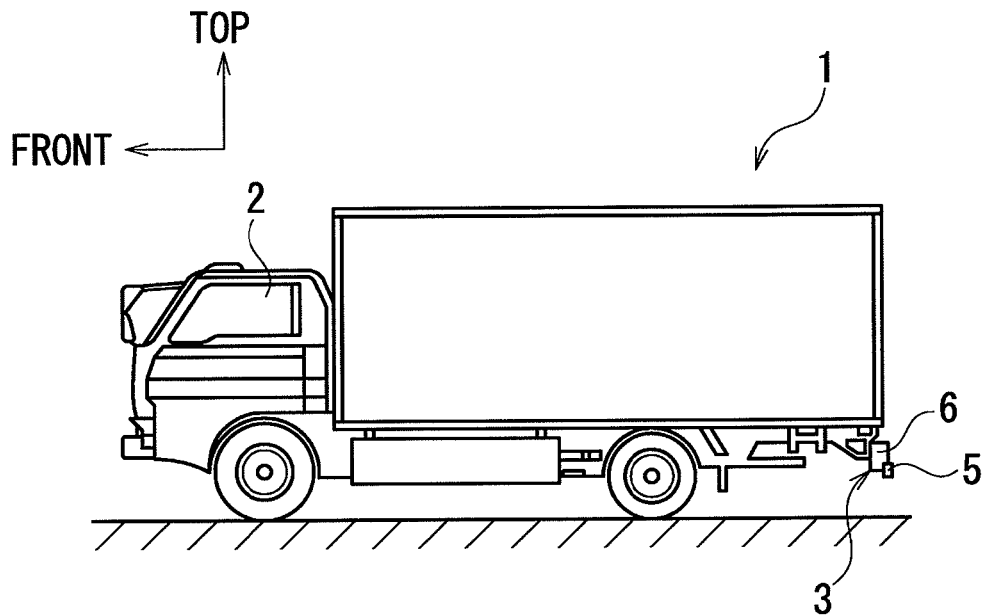
FIG. 8 is a schematic side view of the cab-over type truck when the underrun protector mounting structure according to the present invention is applied to a rear underrun protector.

Note that, in this embodiment, the underrun protector mounting structure 3 is applied to the front underrun protector 5 disposed at the front of the vehicle 1. Meanwhile, as shown in FIG. 8, the underrun protector mounting structure 3 can also be applied to a rear underrun protector disposed at the rear of the vehicle.

Moreover, although the two plate-like members, the first and second plate parts 31 and 32, are used to form the support part 7, three or more plate-like members may be used to form the support part.

Furthermore, the rib receiving parts 30, the protrusions 37 and the ribs 46 are provided on the bracket 6, the first plate part 31 and the second plate part 32, respectively, at two spots on each part. However, those described above can also be provided at three or more spots.

Figure 9:
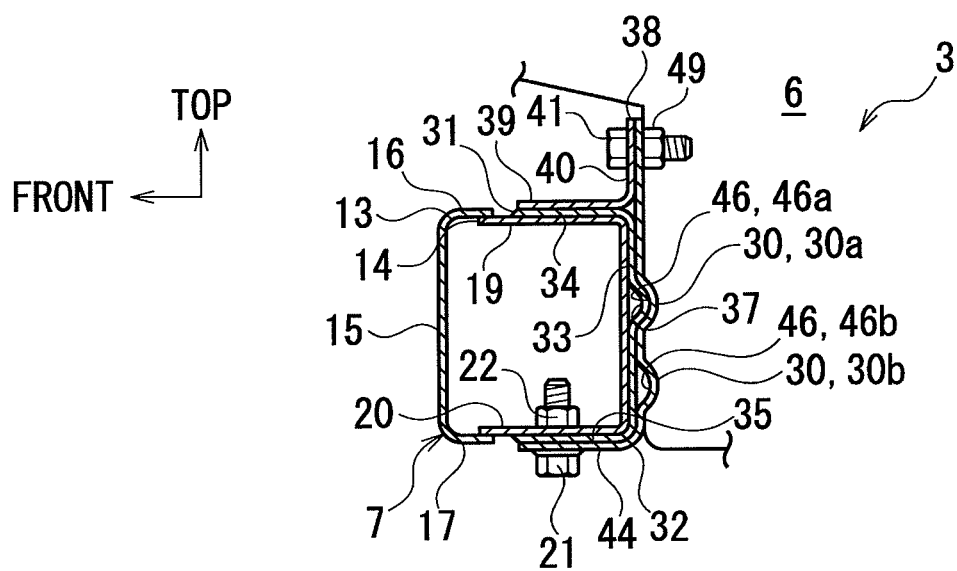
FIG. 9 is an enlarged cross-sectional view of a main part, showing another embodiment of the underrun protector mounting structure according to the present invention.
Figure 10:
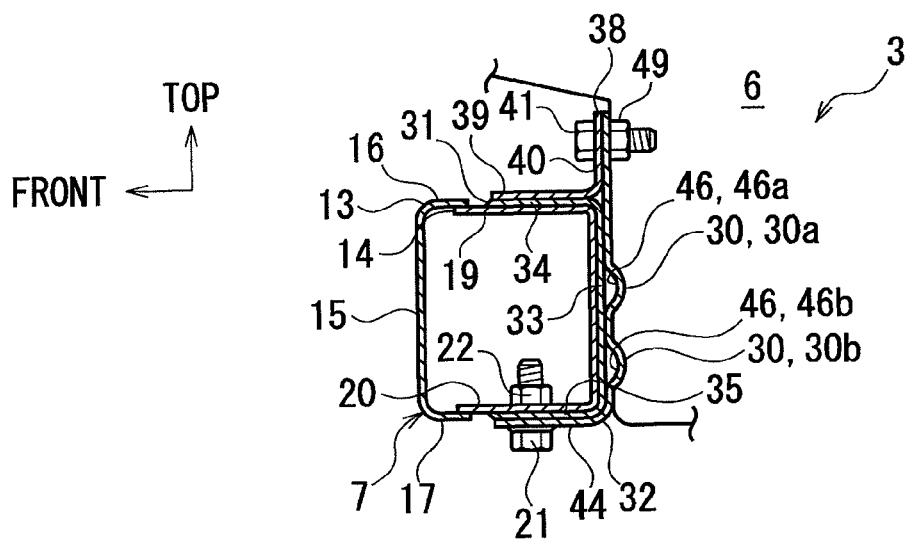
FIG. 10 is an enlarged cross-sectional view of a main part, showing another embodiment of the underrun protector mounting structure according to the present invention.
Figure 11:
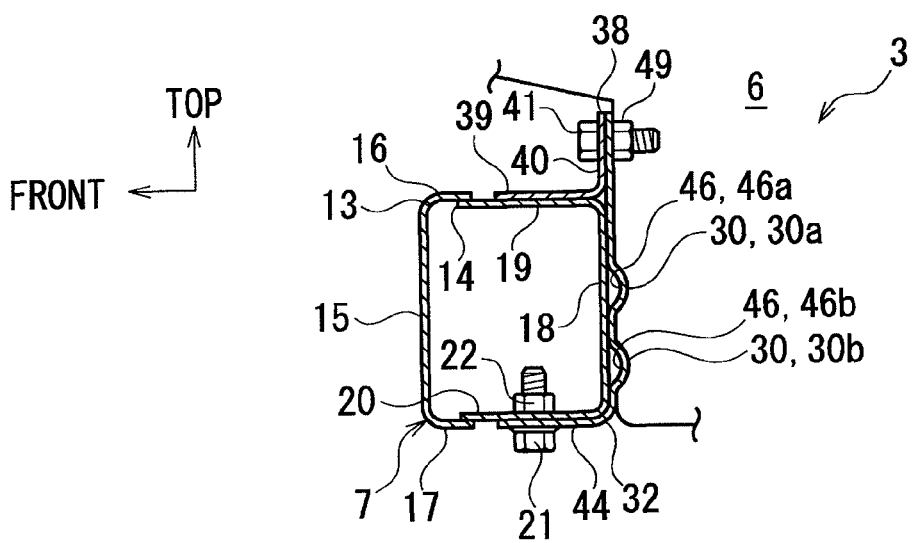
FIG. 11 is an enlarged cross-sectional view of a main part, showing another embodiment of the underrun protector mounting structure according to the present invention.

Moreover, as shown in FIG. 9, a mounting height of an underrun protector may be adjusted by providing a plurality of rib receiving parts 30 in a bracket 6 and providing only one rib 46 in a second plate part 32, which can be fitted to any of the rib receiving parts 30. Furthermore, depending on rigidity and strength required for the underrun protector, no protrusions 37 may be provided in a first plate part 31 as shown in FIG. 10. Moreover, as shown in FIG. 11, a first plate part 31 itself may be not provided. The structure as described above makes it possible to expand the scope of selection of the mounting height and the versatility of the underrun protector while maintaining the connection performance of the underrun protector with the bracket 6. Moreover, it is possible to flexibly meet the rigidity and strength required for the underrun protector while minimizing the increase in weight.

The above description has been given of the embodiment to which the invention made by the present inventors is applied. However, the present invention is not limited to the description and the drawings which constitute a part of the disclosure of the present invention according to the embodiment. Specifically, it may be added that, needless to say, other embodiments, examples, operational technologies and the like, which are made by those skilled in the art based on the embodiment, are all included in the scope of the present invention.

INDUSTRIAL APPLICABILITY

Thus, the underrun protector mounting structure of the present invention can be applied to vehicles having different ground clearances without impairing functions of the underrun protector.

The invention claimed is:

1. An underrun protector mounting structure of a vehicle, comprising:
    a vehicle body frame;
    an underrun protector which is disposed at any one of the front and rear of the vehicle body frame and extended in a lateral direction of the vehicle;
    a bracket for fixing the underrun protector to the vehicle body frame; and
    a support part interposed between the underrun protector and the bracket, wherein:
    the support part has a rib projected toward the bracket and extended along the lateral direction of the vehicle,
    the bracket has a plurality of rib receiving parts which are formed approximately parallel to each other in a vertical direction of the vehicle with a space between each two of the rib receiving parts, which each is adapted to be fitted to the rib,
    a mounting height of the support part relative to the bracket is set by selecting one of the plurality of rib receiving parts and fitting the selected rib receiving part to the support part, and
    the support part is formed as a separate part to which the underarm protector is detachably mounted and which is detachably mounted to the bracket.

2. The underrun protector mounting structure of a vehicle, according to claim 1, wherein:
    the support part has an approximately plate-like first plate part and an approximately plate-like second plate part superposed on the first plate part on the bracket side,
    the first plate part has a protrusion projected toward the second plate part and extended along the lateral direction of the vehicle, and
    the second plate part has the rib and is superposed on the first plate part in a state where a convex outer surface of the protrusion is fitted to a concave inner surface of the rib.

3. The underrun protector mounting structure of a vehicle, according to claim 1, wherein:
    a width of the support part in the lateral direction of the vehicle is set larger than that of the bracket in the lateral direction of the vehicle on the underrun protector side.

4. The underrun protector mounting structure of a vehicle, according to claim 1, wherein:
    the support part has a plurality of the ribs and
    the plurality of ribs are disposed approximately parallel to each other in a vertical direction of the vehicle with a space between each two of the ribs.

5. The underrun protector mounting structure of a vehicle, according to claim 2, wherein:
    a width of the support part in the lateral direction of the vehicle is set larger than that of the bracket in the lateral direction of the vehicle on the underrun protector side.

6. The underrun protector mounting structure of a vehicle, according to claim 2, wherein:
    the support part has a plurality of the ribs and
    the plurality of ribs are disposed approximately parallel to each other in a vertical direction of the vehicle with a space between each two of the ribs.

7. The underrun protector mounting structure of a vehicle, according to claim 3, wherein:
    the support part has a plurality of the ribs, and
    the plurality of ribs are disposed approximately parallel to each other in a vertical direction of the vehicle with a space between each two of the ribs.

8. A mounting structure for an underrun protector of a vehicle, comprising:
    a bracket which fixes the underrun protector to a vehicle body frame and comprises rib receiving parts which are formed substantially parallel to one another in a vertical direction of the vehicle with a space between each two of the rib receiving parts; and
    a support part interposed between the underrun protector and the bracket and comprising a rib projected toward the bracket and extending along a lateral direction of the vehicle, wherein
    each rib receiving part is adapted to be fitted to the rib, and
    a mounting height of the support part relative to the bracket is set by selecting one of the rib receiving parts and fitting the selected rib receiving part to the rib of the support part.

9. The mounting structure according to claim 8, wherein the support part comprises:
    an approximately plate-like first plate part comprising a protrusion projected toward the second plate part and extending along the lateral direction of the vehicle, and
    an approximately plate-like second plate part superposed on the first plate part on the bracket side and comprising a rib,
    wherein a convex outer surface of the protrusion is fitted to a concave inner surface of the rib when the second plate is superposed on the first plate part.

10. The mounting structure according to claim 8, wherein:
    a width of the support part in the lateral direction of the vehicle is set larger than that of the bracket in the lateral direction of the vehicle on the underrun protector side.

11. The mounting structure according to claim 8, wherein:
    the support part has a plurality of ribs, and
    the ribs are disposed approximately parallel to each other in the vertical direction of the vehicle with a space between each two of the ribs.

* * * * *